United States Patent
Suzuki

(10) Patent No.: US 7,768,561 B2
(45) Date of Patent: Aug. 3, 2010

(54) IMAGE SENSING APPARATUS AND ITS CONTROL METHOD

(75) Inventor: Shoichi Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 971 days.

(21) Appl. No.: 11/468,211

(22) Filed: Aug. 29, 2006

(65) Prior Publication Data

US 2007/0052811 A1    Mar. 8, 2007

(30) Foreign Application Priority Data

Sep. 2, 2005    (JP) .............................. 2005-255616

(51) Int. Cl.
*H04N 5/335* (2006.01)
*H04N 3/14* (2006.01)

(52) U.S. Cl. ........................ 348/294; 348/295; 348/296; 348/297; 250/208.1

(58) Field of Classification Search ......... 348/294–324; 250/208.1
See application file for complete search history.

(56) References Cited

U.S. PATENT DOCUMENTS 7,489,353 B2 *    2/2009    Funakoshi ................... 348/296

FOREIGN PATENT DOCUMENTS

JP    2001-78081    3/2001

* cited by examiner

*Primary Examiner*—Yogesh K Aggarwal
(74) *Attorney, Agent, or Firm*—Canon U.S.A., Inc. I.P. Division

(57) ABSTRACT

A drive mode is switched after readout for one frame is completed, and the reset operation for the following frame is started. In this manner, the reset operation for the following frame will not be performed during the readout period for the preceding frame. Therefore, the accumulation period for the following frame can be made consistent in that frame.

1 Claim, 16 Drawing Sheets

BEFORE ADDITION

AFTER ADDITION

| R | G |
|---|---|
| G | B |

READOUT TIME PER LINE

| HBLK | Skip | HBLK | READOUT TIME FOR HORIZONTAL PIXELS |
|------|------|------|-----------------------------------|
| HBLK | Skip | HBLK | READOUT TIME FOR HORIZONTAL PIXELS |

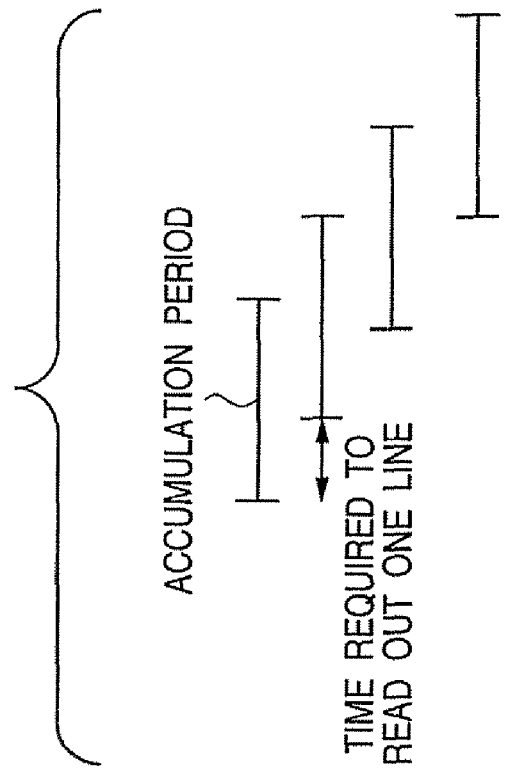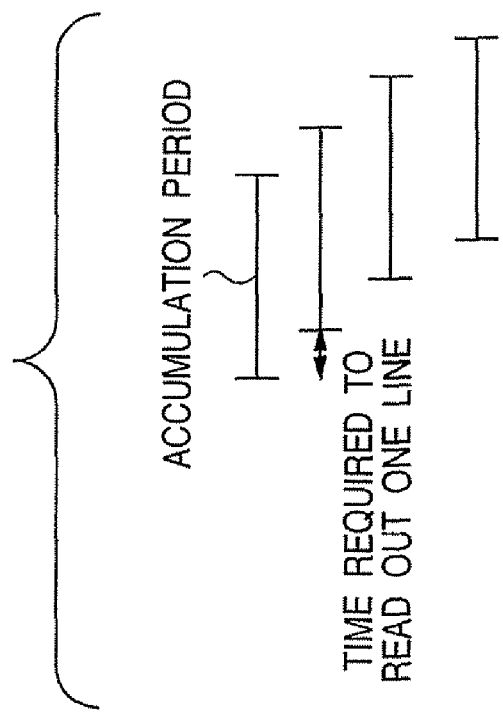

F I G. 10A
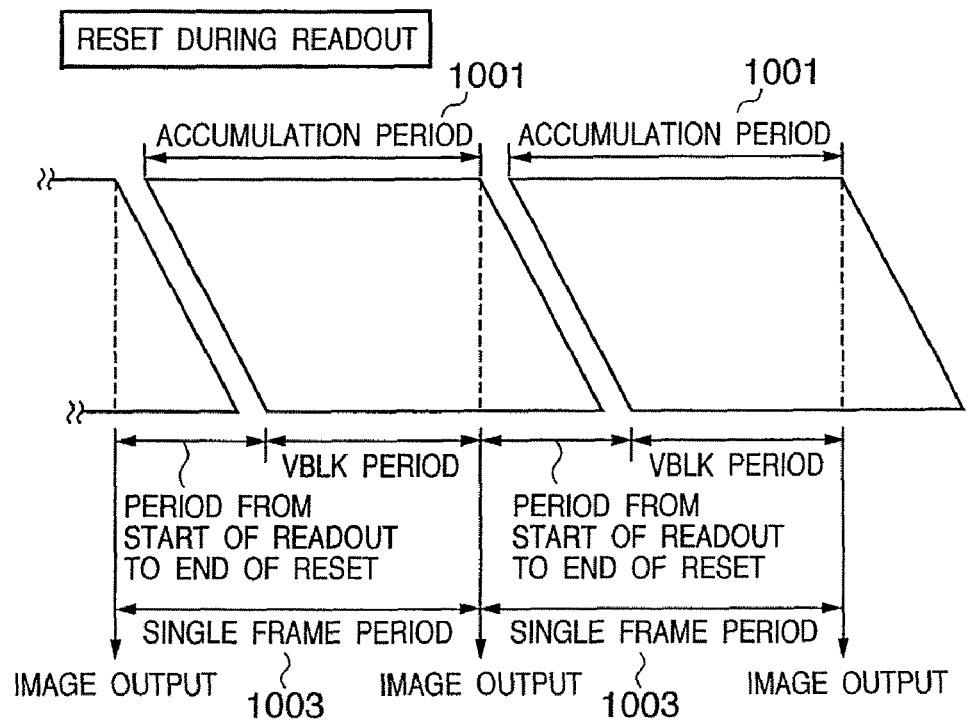
F I G. 10B
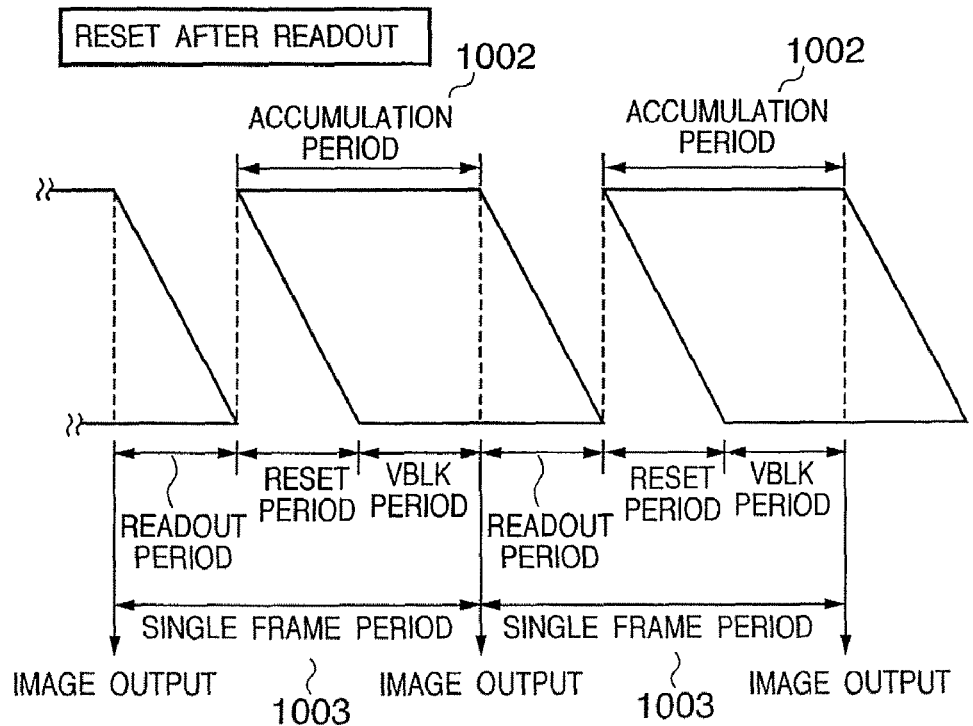

IMAGE SENSING APPARATUS AND ITS CONTROL METHOD

BACKGROUND OF THE INVENTION

1. Field of the Invention

The present invention relates to an image sensing apparatus and its control method.

2. Description of the Related Art

An exemplary mechanism for electronic zoom processing in CCD cameras is shown in FIG. 1. In FIG. 1, reference numeral 100 denotes a lens, reference numeral 101 denotes a charge-coupled device (CCD), reference numeral 102 denotes a correlated double sampling circuit (CDS), and reference numeral 103 denotes a clamping circuit (CLP). Further, reference numeral 104 denotes an analog-digital converter (A/D), reference numeral 105 denotes frame memory, reference numeral 106 denotes a zoom controller, reference numeral 108 denotes an image compensation unit, and reference numeral 107 denotes an image output.

In this mechanism, an optical image passes through the lens 100 and is formed on a photo-sensing surface of the CCD 101, which is an image sensing device. The optical image formed on the photo-sensing surface of the CCD 101 is converted into photo-charges in a two-dimensionally arranged photoelectric converter and sequentially transferred to the output. The correlated double sampling circuit 102 eliminates a CCD-specific reset noise from the output signals of the CCD 101 to generate sampled-and-held video signals that are reset noise free.

The clamping circuit 103 performs clamping at the dark level, and the AD converter 104 converts the input analog signals into digital signals. The frame memory 105 is memory for recording data on all pixels of one frame. The zoom controller 106 reads out only a partial area around the center of the CCD when, for example, 2× zoomed image data is desired.

Recently, CMOS image sensors have been increasingly in use because they are inexpensive, require no complicated timing generation circuits, and operate with a single power supply while consuming less power. Furthermore, the CMOS image sensors have a characteristic which CCD image sensors do not have, i.e., the ability of capturing only arbitrary areas of the CMOS image sensors as an image.

Description will be given of a high image quality electronic zooming of a CMOS image sensor capable of reading out arbitrary areas (see Japanese Patent Laid-Open No. 2001-78081). FIG. 2 is a conceptual view of electronic zoom operations for CMOS image sensors. Reference numeral 201 in FIG. 2 denotes readout method in normal mode, and reference numeral 202 in FIG. 2 denotes readout method in zoom mode. In normal mode, for example, a value obtained by adding together four pixel values of a solid image sensing device is read out as a pixel value for one pixel. In the range inside a bold line of 201, pixel values for shaded pixels are read out, wherein each pixel value is obtained by adding together four pixel values of that pixel and pixels at the right, lower right, and directly below that pixel. That is, pixel values for 4×4 pixels are read out from the range of 8×8 pixels.

On the other hand, in zoom mode, pixel values of an area of continuous 4×4 pixels (a shaded part) around the center of the range of 8×8 pixels inside the bold line are directly read out without addition. Then, the center portion in the bold line can be displayed in an enlarged form. In addition, since the number of read-out pixels is the same as that in normal mode and no pixel padding by signal processing is required, high image quality can be provided in electronic zooming.

When photo-charges are accumulated in a CMOS sensor capable of block readout, the timing of starting the accumulation is controlled on a line basis. Therefore, the time of accumulating the photo-charges does not align between the lines. This temporal misalignment between the lines corresponds to the time required to read out one line. This time required to read out one line may be calculated by the following equation.

The readout time per line $$= HBLK \times \alpha + Skip \times \beta + \text{the number of horizontal pixels} \times \text{reference clock time} \quad \text{Equation (1)}$$

($\alpha$ and $\beta$ are values determined by the manner of addition in the vertical direction.)

As an example, FIGS. 3A to 3C show driving that involves adding together and averaging two pixel lines in the vertical direction, where $\alpha$ is 2 and $\beta$ is 1. That is, the readout period per line is determined by summing the following: time HBLK required to transfer the first line, time Skip required to skip the second line, time HBLK required to transfer the third line, and the time required to transfer pixel values in the horizontal direction obtained by adding together and averaging the first and third lines.

The time required to transfer the pixel values in the horizontal direction also depends on the reference clock time (the drive frequency). That is, the readout period per line varies with the manner of addition in the vertical direction and the drive frequency. As a result, the misalignment of the time to start accumulation between the top and bottom of a screen varies with changes in these drive mode conditions.

FIGS. 4A and 4B are diagrams for describing the misalignment of the accumulation period according to the readout period per line. Comparing FIGS. 4A and 4B, the readout period per line in FIG. 4B is longer. Herein, the driving as in FIG. 4A with the shorter readout period per line will be referred to as a "drive mode A", and the driving as in FIG. 4B with the longer readout period per line will be referred to as a "drive mode B." In drive mode A, the misalignment of the accumulation period between the top and bottom of the same display screen is smaller than that in drive mode B.

Referring to FIG. 5, description will be given of the case where the drive mode is switched in taking moving images, using EVF (Electronic View Finder) and so forth. In FIG. 5, reference numeral 501 denotes the sum of the accumulation period and the readout period for pixel values in a frame driven in drive mode A. In FIG. 5, for lines for which readout for one frame has finished, accumulation of photo-charges for the following frame is started. Therefore, the readout period for the preceding frame overlaps the start of accumulation for the following frame. Reference numeral 502 denotes the sum of the accumulation period and the readout period when the drive mode is switched from drive mode A to drive mode B at time t1. The switching of the drive mode is performed during the VBLK (vertical blanking) period after the pixel values in the frame 2 are read out. That is, the accumulation start timing corresponding to drive mode A is set for lines before the drive mode switching, and the accumulation start timing corresponding to drive mode B is set for lines after the drive mode switching.

In the example shown in FIG. 5, the driving is performed in drive mode A before time t1, at which point the driving is switched to drive mode B. Since the reset starting time for the frame 3 is before time t1, the gradient due to the misalignment of the accumulation start timing in the period before time t1 corresponds to drive mode A. However, the drive mode is switched to drive mode B at time t1, so that the readout period becomes longer in contrast to drive mode A. As a result, the misalignment of the reset start timing for lines for which the reset is started after time t1 corresponds to drive mode B, causing a different gradient of misalignment. Then, trying to maintain the frame rate would cause a difference in the accumulation period between the top and bottom of the same display screen for the frame 3.

Thus, as in the above example, when the readout period for a frame overlaps the accumulation period for the following frame, switching the drive mode causes a difference in the accumulation period in the following frame, thereby reducing the quality of the output image.

SUMMARY OF THE INVENTION

According to one aspect of embodiments of the present invention relates to an image sensing apparatus comprising, an image sensing unit adapted to generate image data in which a plurality of lines are arranged, each line having a plurality of pixel circuits each including a light-receiving unit which generates and accumulates charges according to a quantity of incident light, a reset unit adapted to execute a first reset mode and a second reset mode on a frame basis, wherein the reset unit sequentially resets the light-receiving units at first time intervals for every predetermined line in the first reset mode, and sequentially resets the light-receiving units at second time intervals different from the first time intervals for every predetermined line in the second reset mode, and a readout unit adapted to execute a first readout mode and a second readout mode on a frame basis, wherein in the first readout mode, the readout unit reads out as pixel values the charges accumulated in the light-receiving units at the first time intervals for every the predetermined line after a predetermined time from start of the reset in the first reset mode, and in the second readout mode, the readout unit reads out as pixel values the charges accumulated in the light-receiving units at the second time intervals for every the predetermined line after a predetermined time from start of the reset in the second reset mode, and wherein, the reset unit performs reset for a frame by the reset mode different from the reset mode of the preceding frame after completion of the readout of pixel values in the preceding frame by the readout unit.

According to another aspect of embodiments of the present invention relates to an image sensing apparatus comprising, an image sensing unit adapted to generate image data in which a plurality of lines are arranged, each line having a plurality of pixel circuits each including a light-receiving unit which generates and accumulates charges according to a quantity of incident light, a reset unit adapted to sequentially reset the light-receiving units for every predetermined line, and a readout unit adapted to read out as pixel values the charges accumulated in the light-receiving units for every the predetermined line after a predetermined time from start of the reset, wherein on a basis of frames of the image data, the readout unit reads out the pixel values after adding the pixel values together when performing readout for a first area of the image sensing unit, and reads out the pixel values after adding the pixel values together for smaller number of pixels than in the readout for the first area or without addition when performing readout for a second area smaller than the first area, and wherein, the reset unit executes, on a frame basis, a reset mode for sequentially resetting at first time intervals for every predetermined line before readout is performed for the first area, and a reset mode for sequentially resetting at second time intervals different from the first time intervals for every predetermined line before readout is performed for the second area, the readout unit performs readout for the first area at the first time intervals for every the predetermined line and performs readout for the second area at the second time intervals for every the predetermined line, and the reset unit performs reset for a frame by the reset mode different from the reset mode of the preceding frame after completion of the readout of pixel values in the preceding frame by the readout unit.

According to further aspect of embodiments of the present invention relates to a method of controlling an image sensing apparatus comprising: an image sensing unit adapted to generate image data in which a plurality of lines are arranged, each line having a plurality of pixel circuits each including a light-receiving unit which generates and accumulates charges according to a quantity of incident light; and a reset unit adapted to execute a first reset mode and a second reset mode on a frame basis, wherein the reset unit sequentially resets the light-receiving units at first time intervals for every predetermined line in the first reset mode, and sequentially resets the light-receiving units at second time intervals different from the first time intervals for every predetermined line in the second reset mode, the method comprising, a readout step of executing a first readout mode and a second readout mode on a frame basis, wherein in the first readout mode, the charges accumulated in the light-receiving units are read out as pixel values at the first time intervals for every the predetermined line after a predetermined time from start of the reset in the first reset mode, and in the second readout mode, the charges accumulated in the light-receiving units are read out as pixel values at the second time intervals for every the predetermined line after a predetermined time from start of the reset in the second reset mode, and a reset step of the reset unit performing reset for a frame after completion of the readout of pixel values in the preceding frame in the readout step.

According to one aspect of embodiments of the present invention relates to a method of controlling an image sensing apparatus comprising: an image sensing unit adapted to generate image data in which a plurality of lines are arranged, each line having a plurality of pixel circuits each including a light-receiving unit which generates and accumulates charges according to a quantity of incident light; and a reset unit adapted to sequentially reset the light-receiving units for every predetermined line, the method comprising, a readout step of a readout unit reading out as pixel values the charges accumulated in the light-receiving units for every the predetermined line after a predetermined time from start of the reset, wherein, on a basis of frames of the image data, the pixel values are read out after adding the pixel values together when readout is performed for a first area of the image sensing unit, and the pixel values are read out after adding smaller number of pixel values together than in the readout for the first area or without addition when readout is performed for a second area smaller than the first area, and wherein, the readout for the first area is performed at first time intervals for every the predetermined line and the readout for the second area is performed at second time intervals different from the first time intervals for every the predetermined line, and a reset step of the reset unit performing reset for a frame by a reset mode different from a reset mode of the preceding frame after completion of the readout of pixel values in the preceding frame by the readout unit, wherein, in the reset step, on a frame basis, a reset mode for sequentially resetting at the first time intervals for every predetermined line is performed before readout is performed for the first area, and a reset mode for sequentially resetting at the second time intervals for every predetermined line is performed before readout is performed for the second area.

Further features of the present invention will become apparent from the following description of exemplary embodiments (with reference to the attached drawings).

BRIEF DESCRIPTION OF THE DRAWINGS

FIGS. 4A and 4B are diagrams for describing a change in the readout period per line when the drive mode is switched;

FIGS. 10A and 10B are diagrams for describing a reduction in the accumulation period according to the embodiments of the present invention;

DESCRIPTION OF THE EMBODIMENTS

Embodiments of the present invention will be described in detail with reference to the drawings.

First Embodiment

Figure 1:
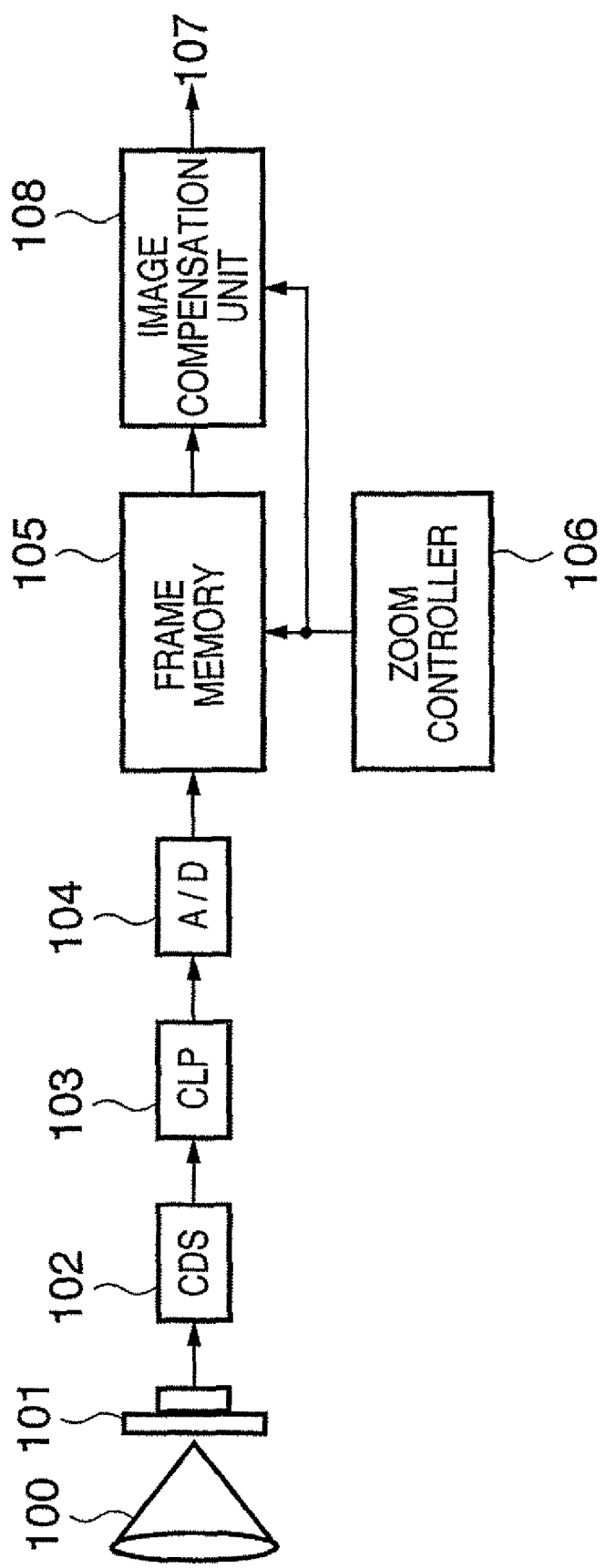
FIG. 1 is a block diagram showing an exemplary mechanism for electronic zoom processing using a CCD.
Figure 2:
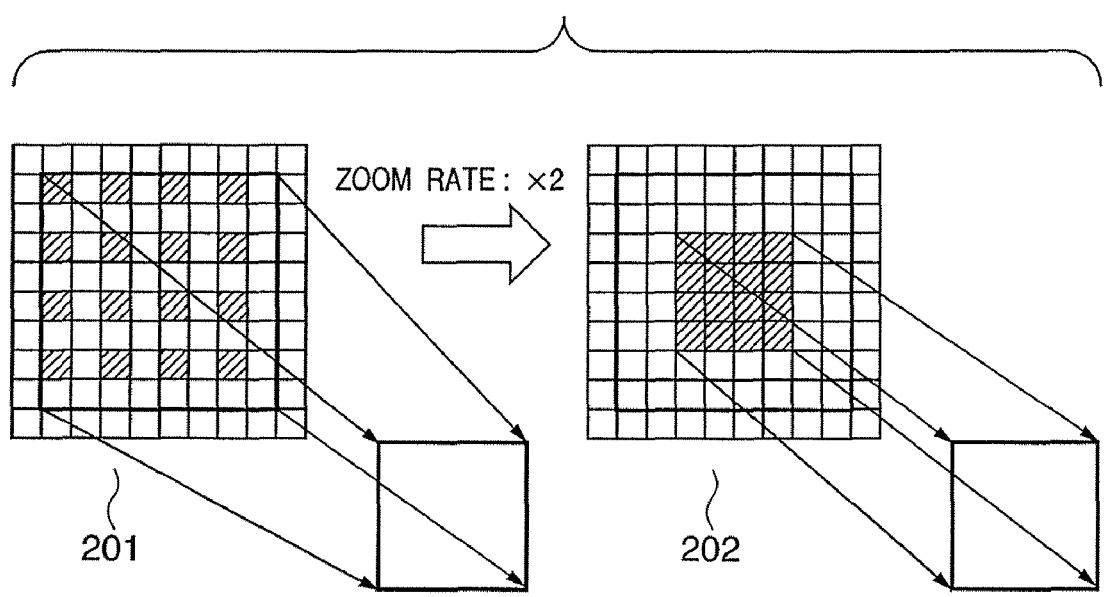
FIG. 2 is a diagram for describing the concept of high image quality electronic zooming using partial readout.
Figures 3A, 3B, 3C:
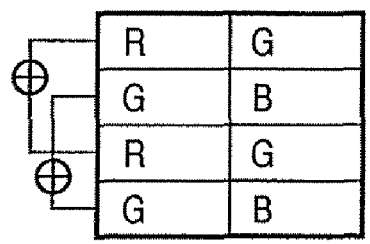
FIGS. 3A, 3B, and 3C are diagrams for describing the concept of a difference in the accumulation period per line in adding together and averaging two pixel lines in the vertical direction.
Figure 5:
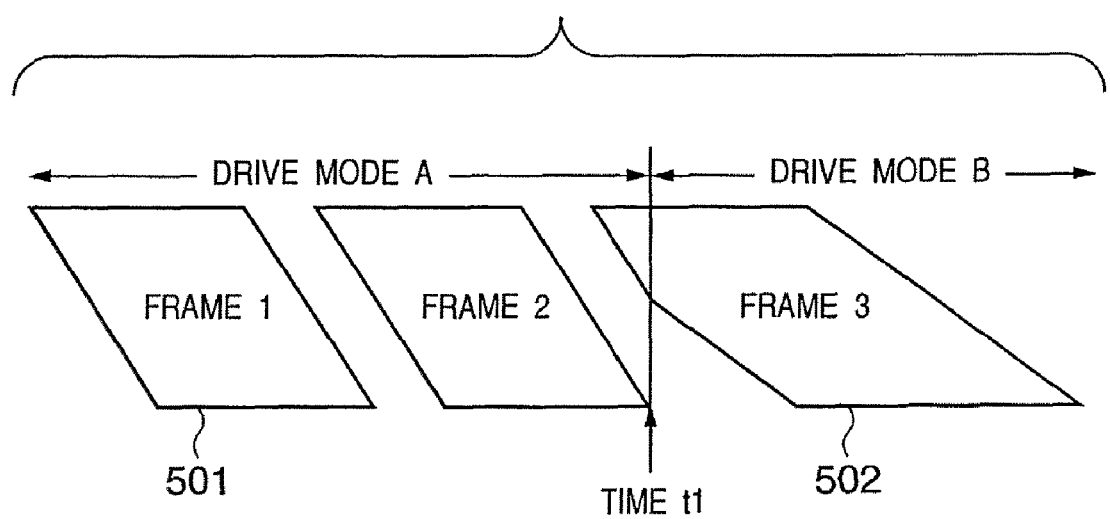
FIG. 5 is a diagram for describing the misalignment of the accumulation period between the top and bottom of the same screen caused by switching of the drive mode.
Figure 6:
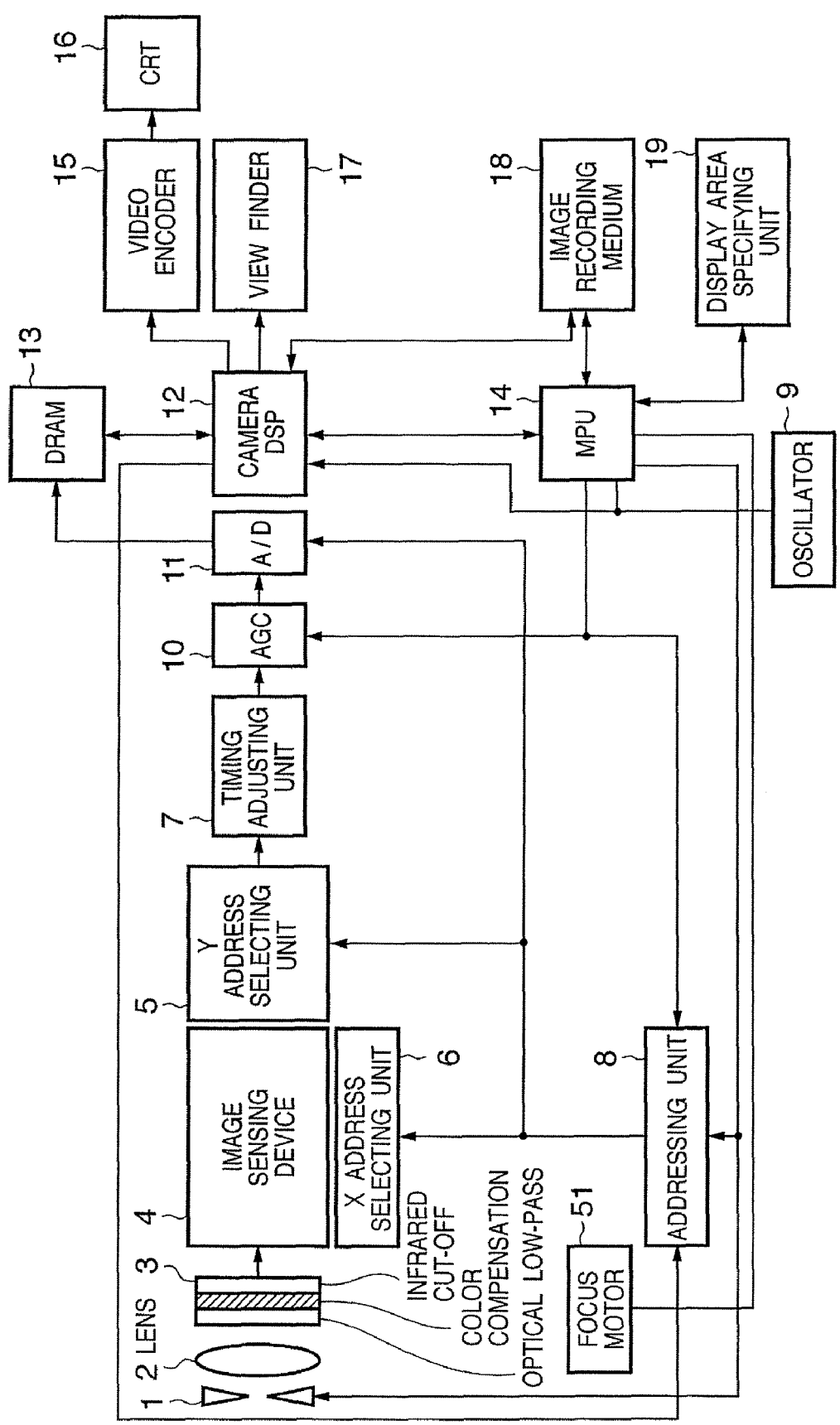
FIG. 6 is a diagram showing an exemplary configuration of an image sensing apparatus according to embodiments of the present invention.

FIG. 6 is a diagram showing an exemplary configuration of an image sensing apparatus according to the embodiments.

In the image sensing apparatus in FIG. 6, a light from an object passes through an aperture blade 1 and is image-formed on an image sensing device 4 by a lens 2. Thus, photoelectric conversion is performed. A filter group 3 is a combination of an optical low-pass filter for cutting off higher frequencies of the light to prevent moiré, a color compensation filter, a filter for cutting off infrared, and so forth.

The signals obtained by the conversion in the image sensing device 4 have their pixel locations selected two-dimensionally by an X address selecting unit 6 and a Y address selecting unit 5 with signals from an addressing unit 8. The locations are read out to a timing adjusting unit 7. The timing adjusting unit 7 adjusts the timing of the outputs (one or more outputs) from the image sensing device 4.

The signals output from the timing adjusting unit 7 have their voltage controlled by an AGC (Auto Gain Control) 10 and are converted into digital signals in an A/D converter 11. A camera DSP 12 performs image processing for moving images or still images. An MPU 14 performs operations such as setting parameters used in this image processing for the camera DSP 12, performing AE and AF processing, and so forth.

The AF control is performed by a focus motor 51 moving a focus lens (not shown) back and forth. An oscillator 9 provides a clock pulse to the Camera DSP 12 and MPU 14. A display area specifying unit 19 accepts specification of the display area from a user of image sensing apparatus. The display area specifying unit 19 may be implemented as a zoom button. DRAM 13 is used as a temporary storage area in the image processing, and an image recording medium 18 is used as a nonvolatile storage area. For example, the image recording medium 18 may be a smart medium, a magnetic tape, or an optical disk. A video encoder 15, a CRT 16, and so forth are provided for display after the image processing.

A viewfinder 17 may be an LCD or the like, for example, and is used for purposes such as checking an object before storing it on the image recording medium 18. The output units are not limited to the CRT 16 and the viewfinder 17 but may be implemented by using a printer and so forth.

The image sensing device 4 according to the embodiments comprises single pixel circuits and readout circuits. First, the configuration and operations of a single pixel circuit will be described with reference to FIG. 7.

Figure 7:
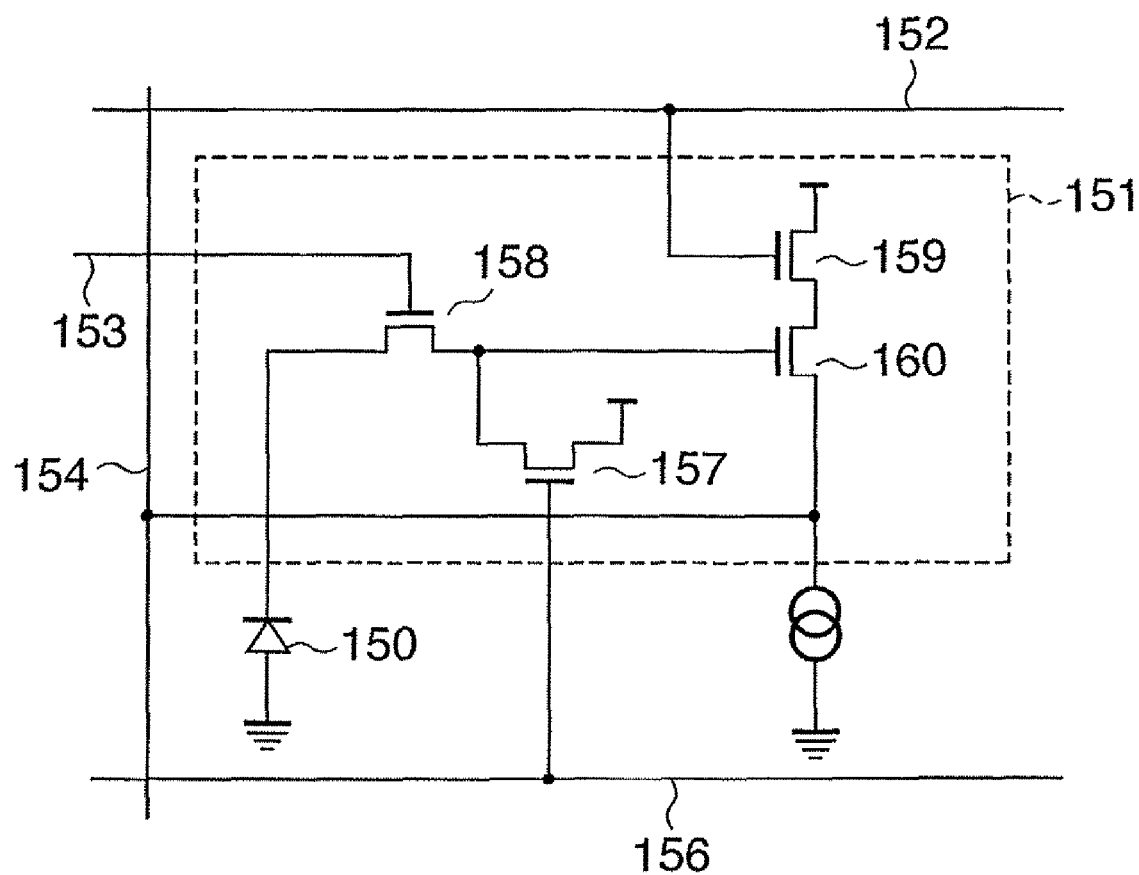
FIG. 7 is a diagram showing an exemplary configuration of a single pixel circuit according to the embodiments of the present invention.

In FIG. 7, a MOS transistor 158 is a transfer gate for controlling a potential barrier, which is used for transferring a charge accumulated in a photodiode (referred to as a PD hereafter) 150 to a floating diffusion (referred to as an FD hereafter) configured to float a gate of amplification MOS transistor 160.

A reset MOS transistor 157 is a transistor for resetting the charge of the PD 150. A MOS transistor 159 is provided for line selection. A gate of the MOS transistor 158 is connected to a transfer signal line 153 for transferring the charge of the PD 150. A gate of the reset MOS transistor 157 is connected to a reset signal line 156 for resetting the FD. A gate of the MOS transistor 159 is connected to a select signal line 152.

The charge accumulated in the PD 150 is first transferred to the FD via the MOS transistor 158 selected by the transfer signal line 153, wherein the FD has been reset by the reset transistor 157 turned on by the reset signal line 156. Then, the charge is amplified at the source follower MOS transistor 160 when the MOS transistor 159 is selected by the select signal line 152, and the charge is read out to a readout line 154.

Figure 13:
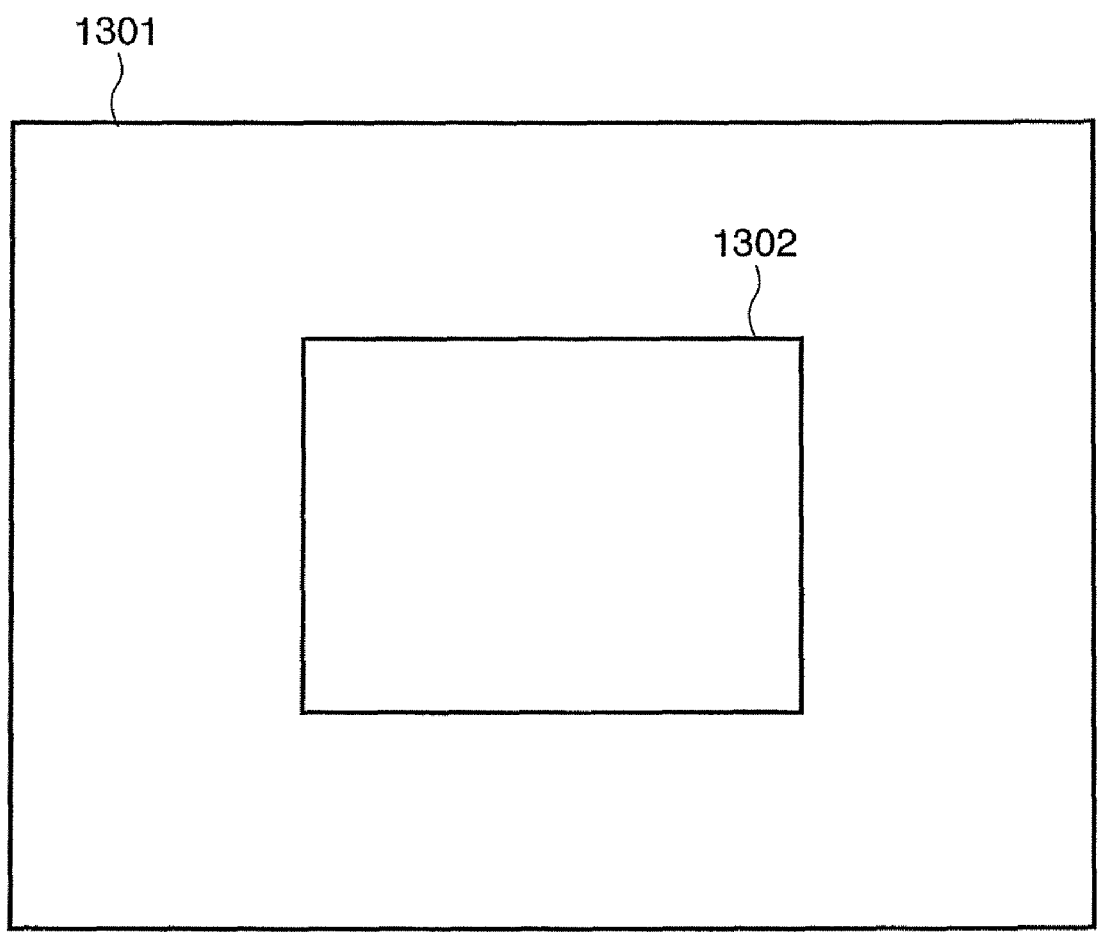
FIG. 13 is a diagram for describing a difference of image sensing areas from which pixel values are read out in a drive mode A and a drive mode B in the embodiments of the present invention.

In the embodiments, when an electronic zoom operation is performed using an image sensing area comprising a set of single pixel circuits as above, pixels included in a partial area within the image sensing area are read out one by one in zoom mode (tele) without addition of pixel values. Alternatively, pixel values of a smaller number of pixels are added together than in normal mode (wide) to be described later. For example, if an image sensing area 1301 shown in FIG. 13 represents the entire area that the image sensing device 4 can image, pixels included in an area 1302 within the area 1301 are read out in zoom mode. Such a driving is referred to as "drive mode A" in the embodiments. On the other hand, in normal mode (wide), pixel values obtained by adding a predetermined number of pixels (e.g., 2×2=4 pixels) together are read out for the entire image sensing area 1301. Such a driving is referred to as "drive mode B" in the embodiments.

The number of pixels added together in drive mode B is not limited to two lines (four pixels) but may be four lines (16 pixels). In that case, drive mode A may involve addition of two lines (four pixels) rather than no addition.

If readout without addition is performed in drive mode A, a single horizontal period (a horizontal period A) corresponds to the period of storing pixel values for one line in the area 1302 into storage capacitors in the readout circuits and then reading out the pixel values from horizontal output lines without addition. On the other hand, in drive mode B, image pixels for two lines are sequentially stored in storage capacitors in the readout circuits, and then added together and read out from the horizontal output lines. Therefore, a single horizontal period (a horizontal period B) corresponds to the period up to reading out the pixel values added together. That is, the horizontal period A is shorter than the horizontal period B.

Figure 8:
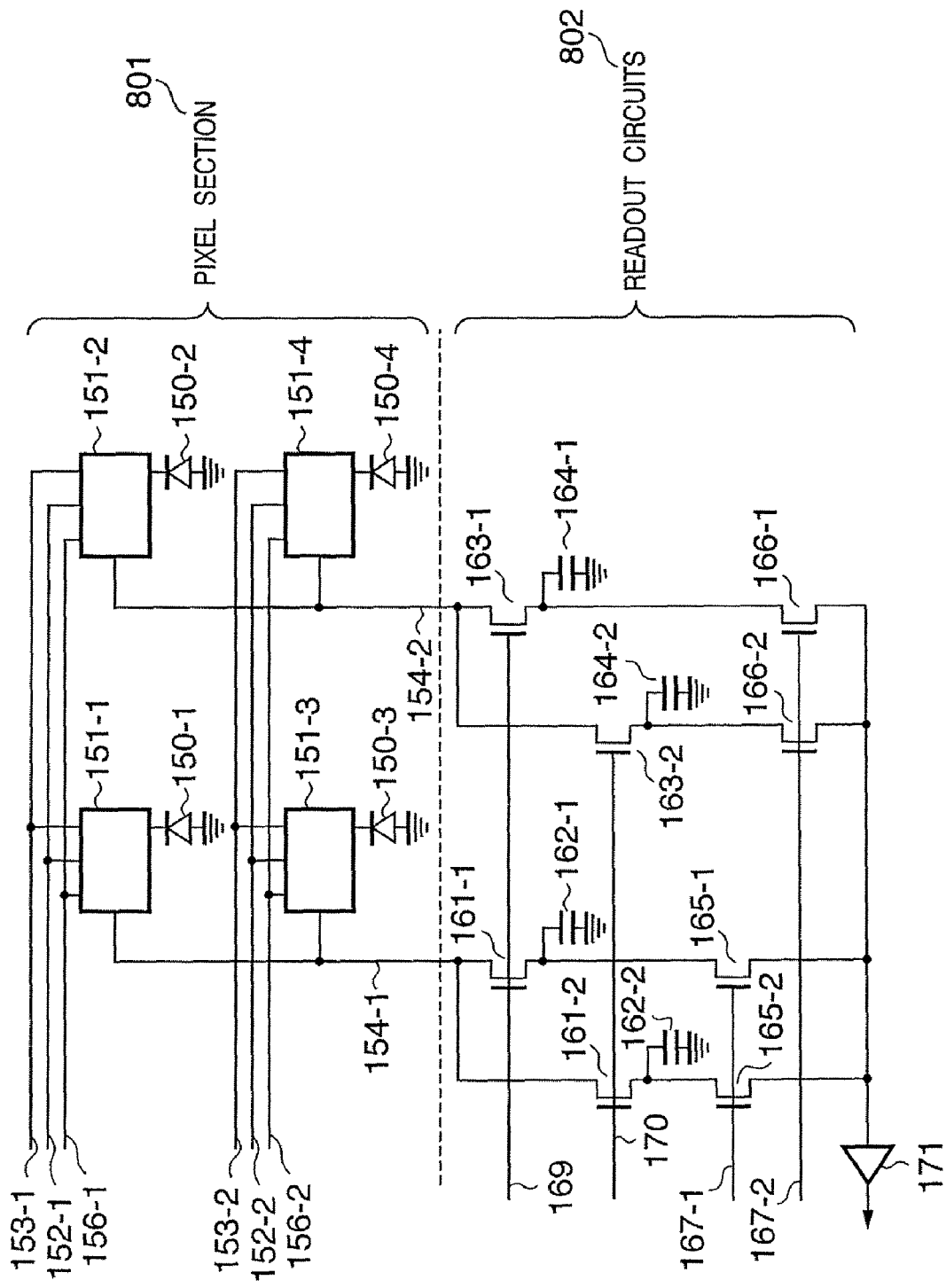
FIG. 8 is a diagram showing an exemplary configuration of pixel circuits and readout circuits according to the embodiments of the present invention.

With reference to FIG. 8, description will be given of a circuit configuration including a pixel section 801 in which a plurality of single pixel circuits shown in FIG. 7 are arranged, and readout circuits 802. For simplicity, only 2×2 pixels are shown in FIG. 8.

First, when pixel values are not added together in drive mode A (control without addition), a MOS transistor 161-1 shown in FIG. 8 is activated by a signal line 169. This causes a charge of a PD 150-1 to be accumulated in a capacitor 162-1. Similarly, a charge of a PD 150-2 is read out to a capacitor 164-1 as readout of the PD 150-1 is controlled by signal lines 156-1, 153-1, 152-1, and 169. Then, signal lines 167-1 and 167-2 are alternately turned on, so that the image signals from the PDs 150-1 and 150-2 are sequentially read out via an amplifier 171. Operations in the vertical direction are performed in a manner similar to the above under the control of 156-2, 153-2, and 152-2.

When pixel values are added together in drive mode B (control with addition), charges of the PDs 150-1 and 150-2 are accumulated in the capacitors 162-1 and 164-1 respectively, under the control of the signal lines 156-1, 153-1, 152-1, and 169 shown in FIG. 8. Then, charges of PDs 150-3 and 150-4 are accumulated in capacitors 162-2 and 164-2 respectively, under the control of the signal lines 156-2, 153-2, 152-2, and 170. Thereafter, the signal lines 167-1 and 167-2 are simultaneously turning on, so that an image signal obtained by adding the charges from the PDs 150-1 to 150-4 together is read out via the amplifier 171.

In this manner, operations in drive mode A and drive mode B can be performed.

In drive mode A, the partial area 1302 in the image sensing area 1301 is selected to read out pixel values therefrom. A mechanism for selecting this partial area will be described with reference to FIG. 14.

Figure 14:
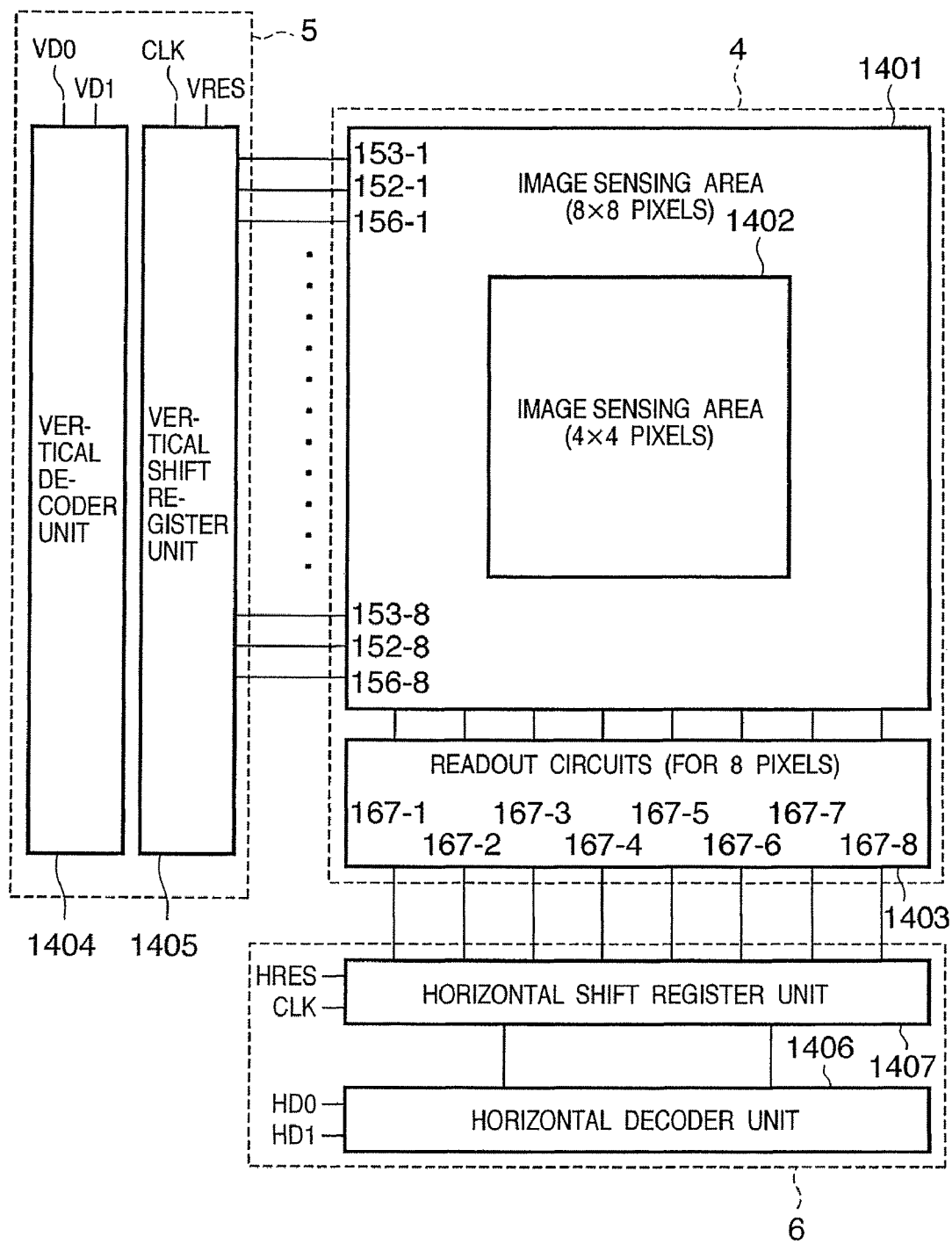
FIG. 14 is a diagram showing an exemplary mechanism for reading out pixel values in a partial area of the image sensing area according to the embodiments of the present invention.

FIG. 14 is a diagram showing a more detailed configuration of the image sensing device 4, the Y address selecting unit 5, and the X address selecting unit 6 according to this embodiment.

In FIG. 14, the image sensing device 4 includes an image sensing area 1401 comprising 8×8 pixels, as well as readout circuits 1403 corresponding to eight pixels in the horizontal direction. An image sensing area 1402 is an area of 4×4 pixels in the image sensing area 1401. In drive mode A, pixel values in the image sensing area 1402 are read out without addition. On the other hand, in drive mode B, pixel values in the image sensing area 1401 are added together and read out. It is assumed that addition of 2×2 pixels is employed here.

The Y address selecting unit 5 comprises a vertical decoder unit 1404 and a vertical shift register unit 1405, whereas the X address selecting unit 6 comprises a horizontal decoder unit 1406 and a horizontal shift register unit 1407. The vertical decoder unit 1404 receives inputs of VD0 to VD1, and the vertical shift register unit 1405 is adapted to receive inputs of a clock pulse (CLK) and a vertical reset pulse (VRES). The vertical shift register unit 1405 outputs select signals 152, transfer signals 153, and reset signals 156. Similarly, the horizontal decoder unit 1406 receives inputs of HD0 to HD1, and the horizontal shift register unit 1407 receives inputs of a clock pulse (CLK) and a horizontal reset pulse (HRES).

The vertical decoder unit 1404 and the horizontal decoder unit 1406 are used to determine which of the entire image sensing area 1401 or the partial image sensing area 1402 is selected. Since the Y address selecting unit 5 and the X address selecting unit 6 operate in almost the same manner in selection of the image sensing area, only selection in the horizontal direction regarding the X address selecting unit 6 will be described below.

Figure 15:
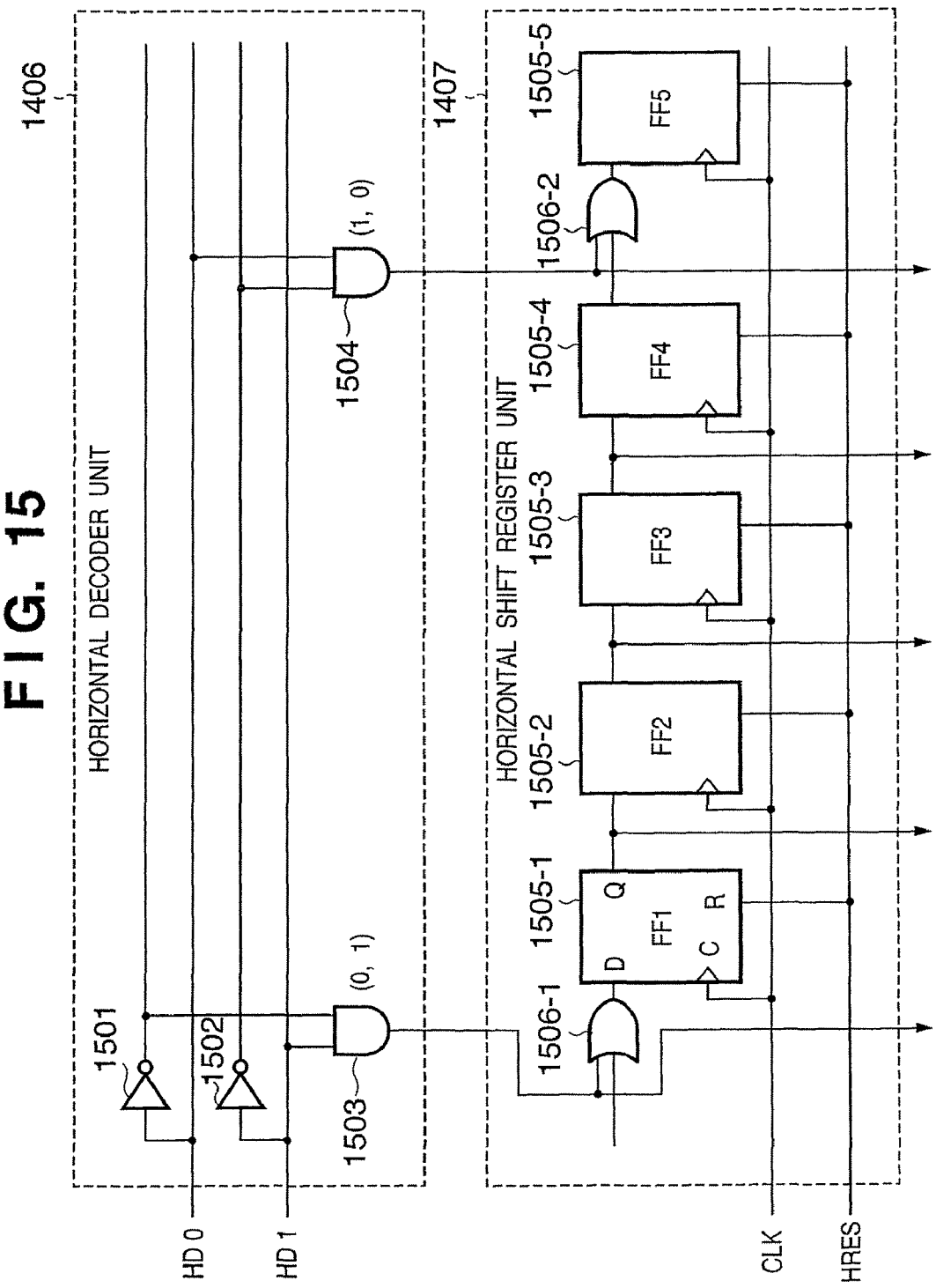
FIG. 15 is a diagram showing an exemplary configuration of a horizontal decoder unit 1406 and a horizontal shift register unit 1407 according to the embodiments of the present invention.

FIG. 15 shows an exemplary configuration of the horizontal decoder unit 1406 and the horizontal shift register unit 1407.

The inputs HD0 to HD1 of the horizontal decoder unit 1406 correspond to two lines (bits). The image sensing area 1401 is divided into three parts of two pixels, four pixels, and two pixels in the horizontal direction. Therefore, the four pixels in the middle may be selected in order to select the image sensing area 1402. As combinations of (HD0, HD1), for example, (0, 0) may correspond to selecting the first two pixels, (0, 1) may correspond to selecting the next four pixels, and (1, 0) may correspond to selecting the last two pixels.

The horizontal shift register unit 1407, located in between the horizontal decoder unit 1406 and the image sensing area 1401, shifts a signal obtained from the horizontal decoder unit 1406 with the clock pulse CLK. Simultaneously, the horizontal shift register unit 1407 outputs a signal 167 to a readout circuit 1403, for reading out a pixel value from a pixel circuit in the image area 1401 via the horizontal output line. To stop driving of the horizontal shift register unit 1407, a signal pulse shifted by the horizontal shift register unit 1407 may be erased using the horizontal reset pulse HRES.

In FIG. 15, the horizontal decoder unit 1406 has inputs of HD0 for the lower digit and HD1 for the higher digit, and comprises inverters 1501 and 1502 and AND circuits 1503 and 1504. The horizontal shift register unit 1407 comprises D flip-flops 1505-1 to 1505-5 and OR circuits 1506-1 and 1506-2. It is noted that the FIG. 15 is illustrated as a simplified view for describing the case where the four pixels corresponding to the image sensing area 1402 are selected out of the eight pixels in the horizontal direction. Therefore, the flip-flops illustrated in the horizontal shift register unit 1407 are only part of actually arranged flip-flops for the eight pixels.

Besides the configuration shown in FIG. 15, the circuit of the horizontal decoder unit 1406 may be implemented by using devices other than AND devices and inverters, and the horizontal shift register unit 1407 may be implemented by a clocked inverter as in conventional cases.

When (0, 1) is input to the inputs for (HD0, HD1) of the horizontal decoder unit 1406, a signal 167 is output to the readout circuit 1403 for the leftmost pixel among the four pixels in the image sensing area 1402. Simultaneously, the flip-flop 1505-1 (FF1) is selected. Then, the clock pulse CLK causes sequential shifting to the FF2 (1505-2), FF3 (1505-3), and FF4 (1505-4) for every clock. The output of the FF4

(1505-4) is input to the FF5 (1505-5) via the OR circuit 1506-2. Therefore, when only the four pixels corresponding to the image sensing area 1402 are selected, the reset pulse HRES may be input rather than inputting (1, 0) for (HD0, HD1) to the AND circuit 1504. To further select the two pixels following these four pixels, (1, 0) may be input for (HD0, HD1) so that the output of the AND circuit 1504 becomes 1.

By driving the vertical decoder unit 1404 and the vertical shift register unit 1405 in a similar manner, the 4×4 pixel area 1402 in the image sensing area 1401 can be selected.

In this manner, only a partial image sensing area can be selected in the entire image sensing area.

Figure 16:
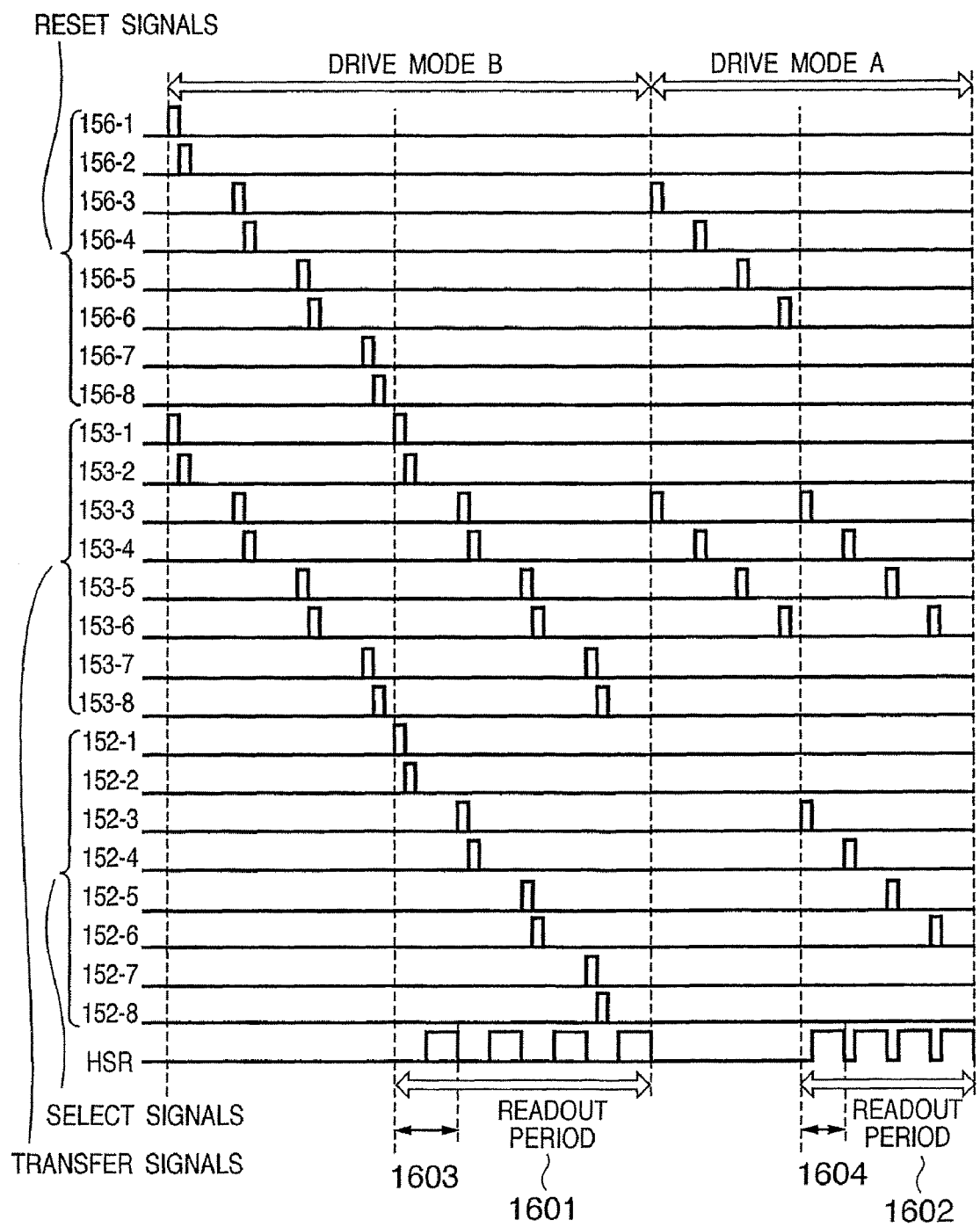
FIG. 16 is an exemplary timing chart of control signals according to the embodiments of the present invention.

FIG. 16 shows a timing chart of the control signals according to FIG. 14. Reference numeral 1601 denotes the readout period in drive mode B, whereas reference numeral 1602 denotes the readout period in drive mode A.

Reference numeral 1603 denotes a single horizontal period in drive mode B. This is the time required to read out pixel values with a pair of select signals, for example 152-1 and 152-2, and then add these pixel values together to read out from the horizontal output line. Reference numeral 1604 denotes a single horizontal period in drive mode A. This is the time required to read out a pixel value with a single select signal line, for example 152-3, and then read out the pixel value from the horizontal output line. The single horizontal period 1603 is longer than the single horizontal period 1604. In addition, the readout periods 1601 and 1602 are defined as a set of such single horizontal periods 1603 and 1604 respectively. Therefore, if the same number of pixels are read out from the horizontal output line as shown in FIG. 16, the readout period 1601 is longer than the readout period 1602.

Next, the control over the switching of the drive mode in an embodiment will be described. In this embodiment, the drive mode is switched after readout for one frame is completed, and the reset operation for the following frame is started. In this manner, the reset operation for the following frame will not be performed during the readout period for the preceding frame. Therefore, the accumulation period for the following frame can be made consistent in that frame. A conceptual view about this will be further described with reference to FIG. 9.

Figure 9:
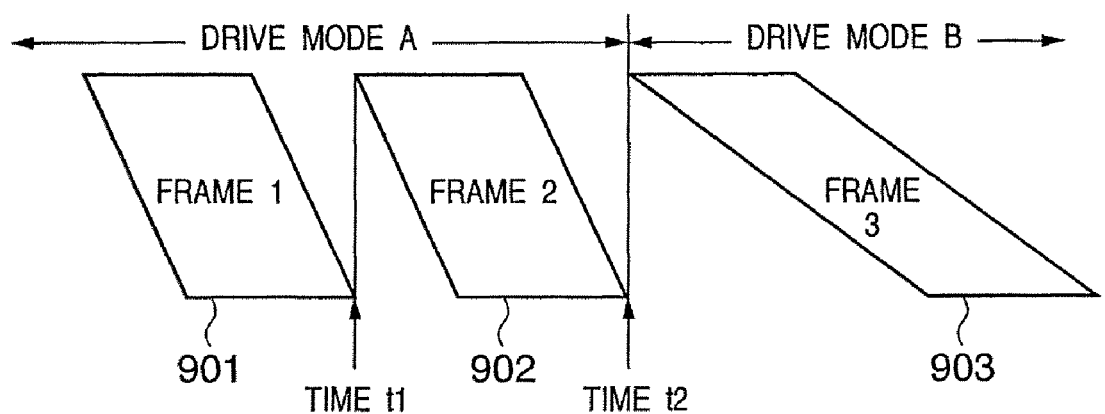
FIG. 9 is a diagram for describing readout timing according to a first embodiment of the present invention.

In FIG. 9, reference numerals 901 to 903 denote the sum of the accumulation period and the readout period for frames 1 to 3 respectively. The frame 1 (901) and the frame 2 (902) are driven in drive mode A. On the other hand, the frame 3 (903) is driven in drive mode B. The frame 1 (901) and the frame 2 (902) do not overlap each other in their readout period and the accumulation period, so that once the readout period for the frame 1 (901) is completed at time t1, the accumulation period for the frame 2 (902) is started. That is, the signal lines 156 and 153 are turned on to reset the PD 150. In FIG. 9, switching from drive mode A to drive mode B is performed at time t2. Time t2 is the point where the readout of pixels of all lines in the frame 2 (902) is completed. Also, the accumulation period for the frame 3 (903) is started at time t2.

In this manner, after the readout of pixels in a frame is completed, the accumulation period for the following frame is started. This allows a consistent accumulation period in that frame even when the drive mode is switched.

However, due to the fact that the accumulation period for the following frame cannot be started until the readout for the preceding frame is completed, the accumulation period naturally becomes shorter than in the case where the readout period overlap the accumulation period between two successive frames, if the frame rate is the same.

For example, in the case of FIG. 10A, accumulation for the following frame is started during the readout period for the preceding frame. The accumulation period 1001 indicates the accumulation period given to the pixels in this case. On the other hand, in the case of FIG. 10B, accumulation for the following frame is started after the readout period for the preceding frame ends. The accumulation period 1002 indicates the accumulation period given to the pixels in this case. The single frame period 1003 determining the frame rate is the same in both FIG. 10A and FIG. 10B.

Comparing the accumulation period 1001 and the accumulation period 1002, it can be seen that 1001>1002. Therefore, when the approach of FIG. 10B according to the present invention is employed, increasing the gain of output pixel values is required.

Specifically, in this embodiment, the short accumulation period can be compensated by gain correction with a certain value for each line in the frames using the AGC 10. Furthermore, this embodiment is characterized in that setting values for signal processing of frames are changed in the DSP 12 after the drive mode switching. This is because, for example, a setting value for the edge enhancement needs to be changed to the optimal value on each switching of the drive mode, since changes in the addition and skipping of pixels caused by the drive mode switching result in the change in the resolution.

It is possible to shorten the time required to read out one line as described above by increasing the driving frequency, and to extend the accumulation period as a result. This improves the readout rate of the CMOS sensor and also solves the problem of the reduced accumulation period, thereby allowing obtaining a normal output without performing the gain correction.

Thus, in this embodiment, the accumulation period for the following frame is started after the readout for the preceding frame is completed. Therefore, even when the drive mode is switched between frames, it is possible to avoid the situation in which the accumulation period becomes inconsistent in the frame immediately after the switching. In addition, for frames with the reduced accumulation period, a gain can be applied to each line to compensate for the reduction.

Second Embodiment

In the first embodiment, for all frames, the timing of starting the accumulation period for the following frame is set to after completion of the readout period. However, the adverse effect of the intensity difference between the top and bottom of the display screen due to the overlap of the readout period and the accumulation period is seen only when the drive mode is switched. In addition, applying a gain to each line in order to compensate for the accumulation period may cause an adverse effect that the S/N ratio deteriorates.

In the present embodiment, the following frame is reset after completion of the readout period only when the drive mode is switched. As a result, the decrease in the S/N ratio can be minimized because only a frame for which the drive mode is switched requires the increase of the gain.

Figure 11:
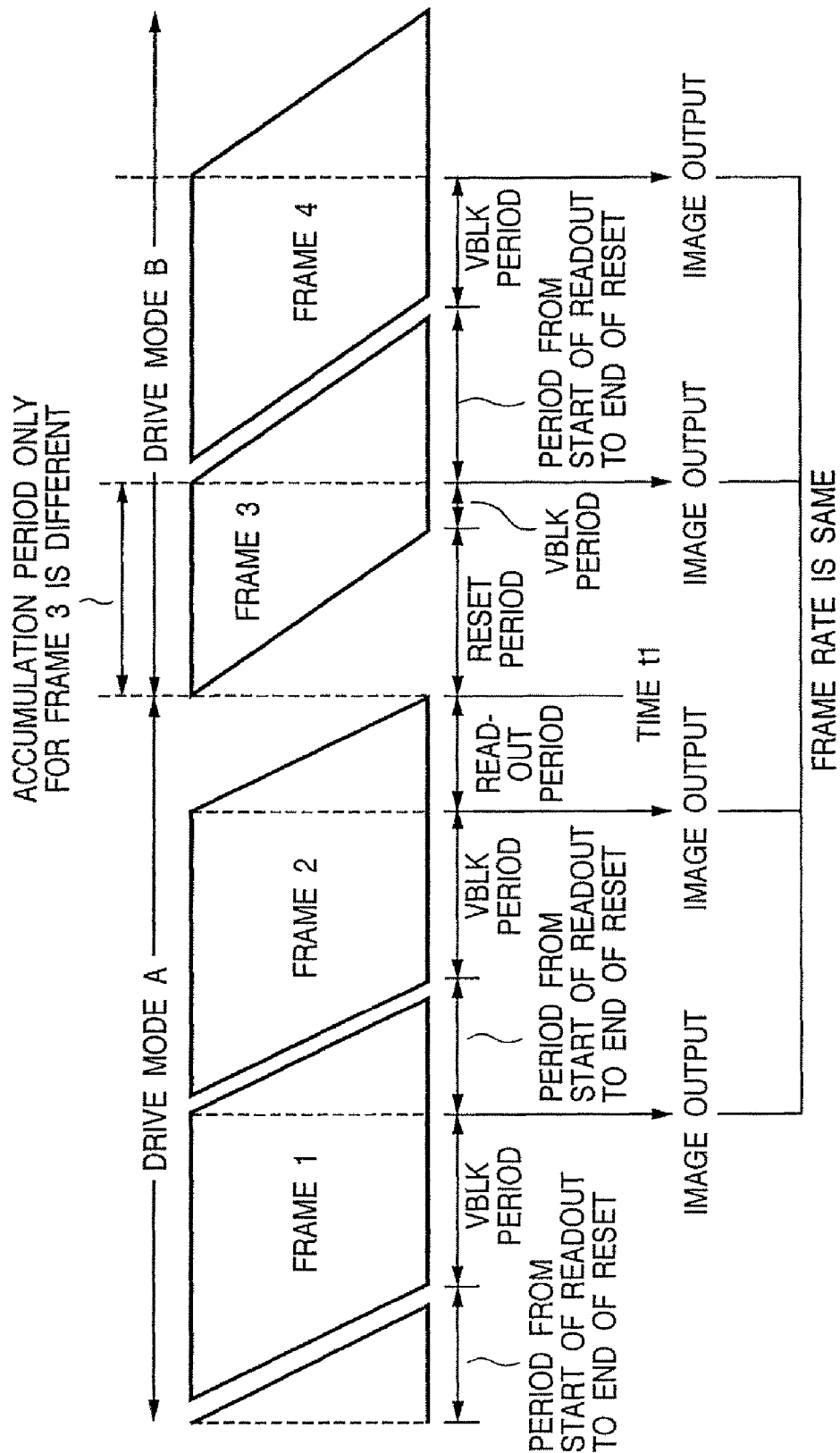
FIG. 11 is a diagram for describing readout timing according to a second embodiment of the present invention.

For example, as shown in FIG. 11, a frame 1 and a frame 2 are in drive mode A, and the readout period for the frame 1 overlaps the accumulation period for the frame 2. If the drive mode is switched from A to B, the drive mode is switched to B after the readout period is completed at time t1, and the accumulation period for a frame 3 is started. Thereafter, the readout period for the frame 3 and the accumulation period for a frame 4 are again set to overlap each other.

In this manner, it is possible to minimize the reduction in the accumulation period by shifting the start of the accumulation period for the following frame only when the drive mode is switched. In addition, the frame rate can be consistent irrespective of the drive mode switching by adjusting the VBLK period for each frame. Furthermore, this embodiment is characterized in that, as in the first embodiment, setting values for the signal processing of frames after the drive mode switching are changed for smooth drive mode switching.

Third Embodiment

In the second embodiment, the frame rate is aligned by adjusting the accumulation period so that the accumulation period for the frame immediately after the drive mode switching becomes shorter than that for other frames. The present embodiment is characterized in that the accumulation period is made equal to that for other frames by adjusting the start time of readout for the frame immediately after the drive mode switching.

Figure 12:
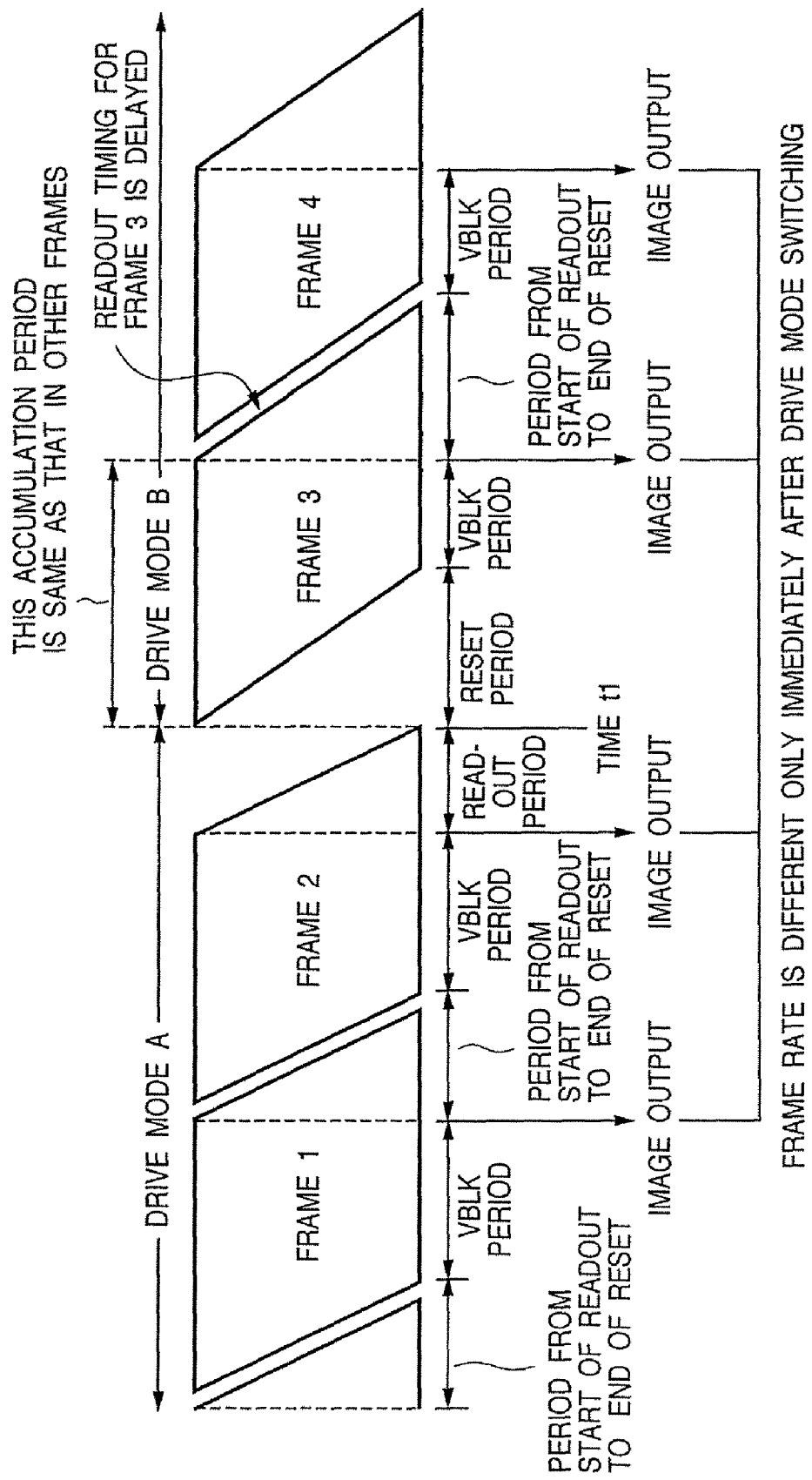
FIG. 12 is a diagram for describing readout timing according to a third embodiment of the present invention.

For example, in FIG. 12, the drive mode is switched from A to B at time t1, so that the timing of reset and readout for the frame 3 and subsequent frames is changed. In this embodiment, again, the accumulation period for the frame 3 is started after completion of the readout period for the frame 2. However, the readout is not started until the accumulation period for the frame 3 becomes equal to that for other frames (the frame 4 and subsequent frames) in drive mode B.

As a result, the misalignment of the accumulation period as in the second embodiment does not occur. This eliminates the need to apply a gain in the vertical direction on the display screen and prevents deterioration of the S/N ratio. Furthermore, as in the first embodiment, the setting values for signal processing of frames after the drive mode switching can be changed for smooth drive mode switching.

The above description has been given for the cases where electronic zooming is performed. That is, it has been described that, in zoom mode (tele), pixel values of pixels included in a partial area of an image sensing area are read out one by one without addition. In normal mode (wide), pixel values obtained by adding together a predetermined number of pixels (e.g., 2×2=4 pixels) are read out for the entire image sensing area 1301.

However, besides the above cases, the following case is also applicable.

When frame images are sequentially being read out, the following processing may be performed for saving power consumption. That is, frame images are sequentially reset at first time intervals for every predetermined line up to a certain frame image. The charges accumulated in the PDs are read out as pixel values at the first time intervals for every said predetermined line. Then, the drive mode is switched, so that subsequent frame images are sequentially reset at second time intervals different from the first time intervals for every predetermined line. The charges accumulated in the PDs are read out as pixel values at the second time intervals for every said predetermined line.

The approaches of the first to third embodiments may be applied to the above technique. This avoids the situation in which, even when the drive mode is switched between frames, the accumulation period is made inconsistent in the frame immediately after the switching.

Other Embodiment

The object of the invention is also achieved by providing a system with a storage medium containing a program code of software for implementing the above-described functions so that the system reads and executes the program code. In that case, the program code itself read from the storage medium implements the functions of the above-described embodiments, and the storage medium containing the program code is included in the present invention. The present invention also covers the case where an operating system (OS) or the like operating on a computer under instructions of the program code performs part or all of actual processing by which the above-described functions are implemented.

The present invention may also be implemented in a manner in which the program code read from the storage medium is written to memory provided in a function extension card inserted into a computer or a function extension unit connected to a computer. Under instructions of the program code, a CPU or the like in the function extension card or the function extension unit performs part or all of actual processing to implement the above-described functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-255616, filed Sep. 2, 2005, which is hereby incorporated by reference herein in its entirety.

What is claimed is:

1. An image sensing apparatus comprising:
    an image sensing unit adapted to generate image data in which a plurality of lines are arranged, each line having a plurality of pixel circuits each including a light-receiving unit which generates and accumulates charges according to a quantity of incident light;
    a reset unit adapted to sequentially reset the light-receiving units for every predetermined line; and
    a readout unit adapted to read out as pixel values the charges accumulated in the light-receiving units for every said predetermined line after a predetermined time from start of the reset, wherein on a basis of frames of the image data, the readout unit reads out the pixel values after adding the pixel values together when performing readout for a first area of the image sensing unit, and reads out the pixel values after adding the pixel values together for smaller number of pixels than in the readout for the first area or without addition when performing readout for a second area smaller than the first area, and
    wherein, the reset unit executes, on a frame basis, a reset mode for sequentially resetting at first time intervals for every predetermined line before readout is performed for the first area, and a reset mode for sequentially resetting at second time intervals different from the first time intervals for every predetermined line before readout is performed for the second area,
    the readout unit performs readout for the first area at the first time intervals for every said predetermined line and performs readout for the second area at the second time intervals for every said predetermined line, and
    the reset unit performs reset for a frame by the reset mode different from the reset mode of the preceding frame after completion of the readout of pixel values in the preceding frame by the readout unit.

* * * * *